H. B. JOHNSTON.
PISTON AND PISTON RING.
APPLICATION FILED AUG. 9, 1920.
1,419,857.
Patented June 13, 1922.
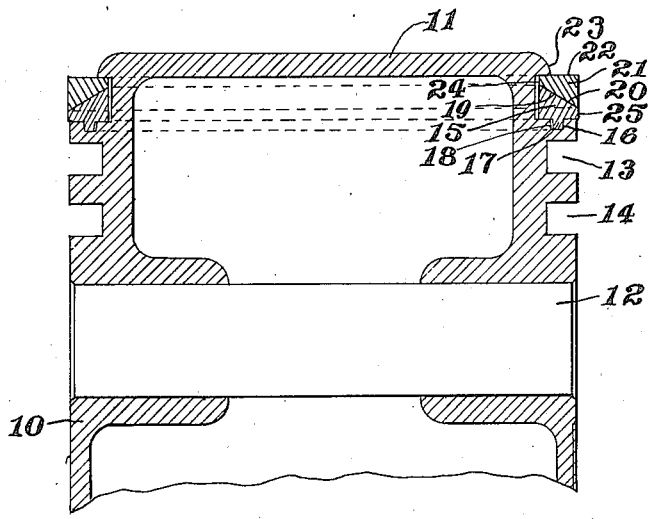
Fig. 1.
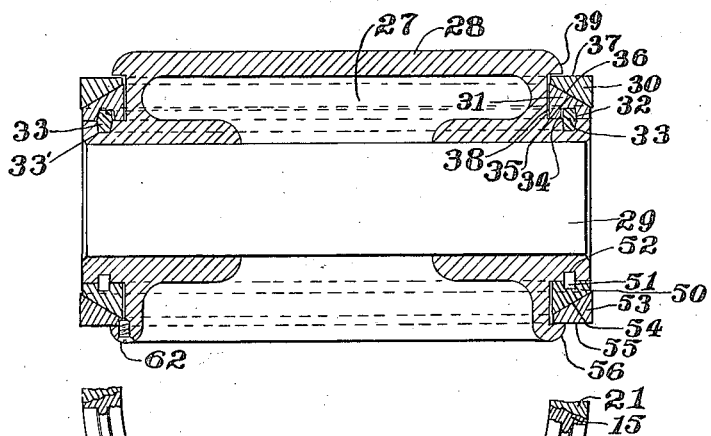
Fig. 2.
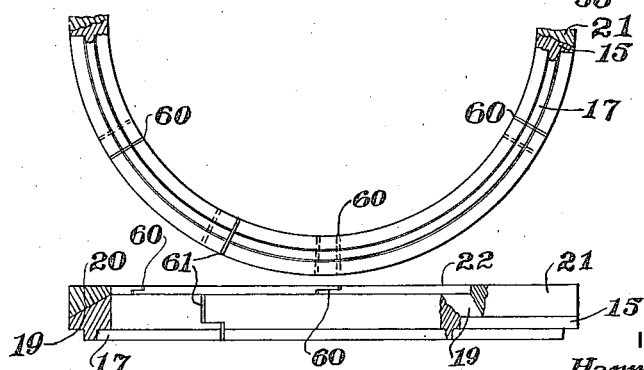
Fig. 3.
Fig. 4.
INVENTOR
*Harry B. Johnston*
BY
*Walter W. Burns*
ATTORNEY

UNITED STATES PATENT OFFICE.

HARRY B. JOHNSTON, OF SEATTLE, WASHINGTON.

PISTON AND PISTON RING.

1,419,857.  Specification of Letters Patent.  Patented June 13, 1922.

Application filed August 9, 1920. Serial No. 402,242.

*To all whom it may concern:*

Be it known that I, HARRY B. JOHNSTON, a citizen of the United States, residing at Seattle, in the county of King and State of Washington, have invented certain new and useful Improvements in Pistons and Piston Rings, of which the following is a specification.

My invention relates to pistons and rings which are adapted for use in fluid engines where it is desired to prevent the passage of a fluid, under pressure, between a piston and its cylinder walls.

An object of my invention is the provision of a piston and ring construction wherein the piston is provided with a cut away place between its end and the ring and wherein the ring is composed of two parts, one of which has an inclined wall and rests at one side of the groove and is held within limits of movement and upon which rests another ring section having an inclined wall in contact with the inclined wall of the complementary ring section, the second ring section having outwardly diverging faces.

Another object of my invention is the provision of a piston and ring construction in which the usual type of piston may be utilized and in which a bearing with an inclined wall is provided for a ring having outwardly diverging surfaces, the outer periphery of an end of the piston being cut away to provide ready access for the fluid under pressure to reach the face of the ring.

Referring to the drawing wherein preferred embodiments of my invention are illustrated, Figure 1 is a cross section of an old type of piston which has been reconstructed in accordance with my invention.

Figure 2 is a cross section of my invention as it would be constructed in a new piston where it was desired to provide a tight seal between the piston and its cylinder and in two directions and showing two slightly different forms of one of the ring sections.

Figure 3 is a fragmentary view of a portion of a ring and showing one of the means for holding the ring against outward movement.

Figure 4 is a side view of the ring structure of the upper portion of Figure 1 showing portions cut away.

Referring particularly to Figure 1, 10 designates a piston of the ordinary type, 11 the head thereof and 12 the wrist connection. 13 and 14 designate the usual rectangular groove, there having been another such groove above the groove 13 prior to the reconstruction of the piston in accordance with my invention. 15 designates a split ring section which is placed in the upper groove after the same has been enlarged and the groove 16 cut to receive the rib 17. The groove 16 is provided with clearance 18 to provide a slight clearance which is preferably about equal to the clearance of the piston in the cylinder. The ring section 15 is provided with a conical or inclined face 19 for cooperation with a similar inclined surface 20 on the ring section 21. The side 22 of the ring section 21 is illustrated as being in a plane. The head of the piston is cut away as at 23 to permit the fluid under pressure to more readily reach the surface 22 of the ring section 21. The surfaces 19 and 20 of the respective ring sections are of conical or inclined shape, the inclination being outwardly and away from the side from which the fluid pressure is to act on the ring to cause a tight seal between the piston and cylinder.

When the pressure at the end of the piston is greater than at the other end, the pressure on the surface 22 will drive the ring section 21 out on the inclined wall 19 of the ring section 15 and against the wall of the cylinder.

At the rear of the ring sections is a carbon space 24.

The rib 17 in the groove 18 is arranged with relation to the outer cylindrical surface 25 and preferably so that the clearance between the rib 17 and groove 18 will be equal to the clearance between the piston and the cylinder. Thus the ring section 15 is limited in its outward movement by the rib and groove structure, and an accumulation of carbon or other substance behind the ring section could not force the ring section 15 out against the cylinder wall and cause scoring of the cylinder.

The ring section 21 is preferably made with a greater radial than axial thickness.

In the upper portion of Figure 2, I have illustrated a form of the ring wherein the groove 32 is located in the ring section 31 and a split ring 33 is provided in the slot 33' and the groove 32 in the ring section. 27 designates the piston, 28 its head and 29 the wrist connection. 30 and 31 designate the ring sections in the upper groove, 32 designates a groove in the ring section 31 and 33 designates a split ring located in the groove 33' and over which the ring section 31 is placed. A clearance 34 is made for the ring 33 in its groove 32 which clearance is preferably equal to the clearance between the piston and its cylinder.

The action between the ring sections 30 and 31 is the same as described for the ring sections 21 and 15. The ring section 31 has an inclined surface 35 upon which rests the surface 36 of the ring section 30. When the pressure of the fluid, at the end of the piston, presses on the surface 37 of the ring section 30, this ring section 30 which is split is caused to expand and bear against the wall of the cylinder. The lower ring section 31 is restrained from movement by the interlocking ring 33 and the groove 32. A carbon space 38 is provided at the rear of the ring sections 30 and 31. The piston is cut away at 39 to permit the pressure to reach the surface 37. The ring section 30 is preferably made with a greater radial thickness than axial thickness.

In the lower portion of Figure 2 is illustrated a ring similar to those already described except that different securing means are provided for limiting the movement of the ring section 50.

The ring section 50 is provided with pins 51 which extend, when the ring is in place in the groove, into the recesses 52 in the body of the piston.

The ring section 53 is provided with the inclined face 54 which contacts with a similar surface on the ring section 50.

The piston is cut away at 56 to permit the fluid under pressure to readily reach the face 55.

The ring section 53 is preferably made with a greater radial thickness than axial thickness.

The outer ring sections 21, 30 or 53 may be split one or more times as indicated at 60 in Figures 3 and 4 where the ring 21 is shown as having a plurality of splits. When split in a plurality of pieces, the ring is particularly adapted for use in out of round cylinders, the pieces being forced to the out of round portions more readily than is possible with the single split ring. When, however, a single split is used, the ring is preferably made with outward spring tension.

The inner ring sections 15, 31 and 50 may be split as shown at 61 in Figure 4.

This invention is not limited, however, to the particular form of splits shown and any suitable form of split may be used.

Suitable means as the screw 62 may be provided to engage a suitable notch in the ring to prevent its turning, thereby preventing the splits from registering. However, an advantage is obtained from permitting the rings to turn freely—the wear is distributed throughout the circumference of the ring.

While I have described cut away portions at the end of the cylinder, this description is not to be considered as a limitation as to the method of manufacture.

While I have described my invention in detail, I desire to have it understood that modifications and changes may be made without departing from the spirit of my invention and within the scope of the appended claims.

Having described my invention what I claim is:

1. In combination, a piston having a groove and a piston ring in the groove, the ring comprising a plurality of ring sections, one of the ring sections having an inclined surface, another of the ring sections having an inclined surface cooperating with the first mentioned inclined surface, one of the sections having interlocking means coacting with a wall of the groove to limit the movement of the ring section therein, the piston being cut away between the ring and the cylinder end whereby the ring is exposed to the pressure at the end of the cylinder.

2. In combination, a piston having a groove and a piston ring in the groove, the ring comprising a plurality of ring sections, one of the ring sections having an inclined surface, another of the ring sections having an inclined surface cooperating with the first mentioned inclined surface, one of the ring sections having a face, opposite its inclined surface, lying substantially in a plane and having interlocking means coacting with a wall of the groove to limit the movement of the ring section in the groove, the piston being cut away between the ring and the cylinder end whereby the ring is exposed to the pressure at the end of the cylinder.

3. In combination, a piston having a groove and a piston ring in the groove, the ring comprising a plurality of ring sections, one of the ring sections having an inclined surface on one side, interlocking means between this section and the groove to limit the movement of the ring section radially, another ring section having an inclined surface cooperating with the first mentioned inclined surface, one of the ring sections having a greater radial thickness than axial thickness and having a face opposite the inclined surface lying substantially in a plane, the piston being cut away between the ring and the cylinder end whereby the ring is exposed to the pressure at the end of the cylinder.

4. In combination, a piston having a groove and a ring in the groove, the ring comprising a plurality of ring sections, interlocking means between one ring section and the groove to limit the radial movement of the ring section, two adjacent ring sections having cooperating inclined surfaces, the piston being cut away between the ring and the cylinder end whereby the ring is exposed to the pressure at the end of the cylinder.

5. In combination, a piston having a groove and a piston ring in the groove, the ring comprising a plurality of ring sections, one of the sections having means extending therefrom and coacting with complementary means in the groove to limit the movement of the ring section in a radial direction, there being coacting inclined surfaces on two adjacent ring sections, the piston being cut away between the ring and the cylinder end whereby the ring is exposed to the pressure at the end of the cylinder.

6. In combination, a piston having a groove and a ring in the groove, the ring having a substantially rectangular cross section and comprising a plurality of ring sections, interlocking means between one of the ring sections and the groove for limiting the radial movement of the section with relation to the piston, there being coacting inclined surfaces on two adjacent ring sections, the piston having a diameter between the ring and the cylinder end smaller than the main body whereby the ring is exposed to the pressure at the end of the cylinder.

7. In combination, a piston having a groove and a piston ring in the groove, the ring comprising two sections, one of the sections having outwardly diverging faces, the other section having an inclined surface in contact with the first mentioned section, interlocking means between the groove and second mentioned section for limiting the radial movement of the ring in the groove, the piston having a diameter between the ring and the cylinder end smaller than the main body whereby the ring is exposed to the pressure at the end of the cylinder.

8. In combination, a piston having a groove and a ring in the groove, the ring comprising two sections, one of the sections having oppositely disposed outwardly diverging surfaces and having a greater radial thickness than axial thickness, the other section having an inclined surface in contact with the first mentioned section and interlocking means between the groove and the face opposite the inclined face for limiting the radial movement of the ring.

In testimony whereof, I affix my signature.

HARRY B. JOHNSTON.